July 14, 1953  N. K. BRODINE  2,645,442
INFANT'S BATHING DEVICE
Filed July 1, 1947
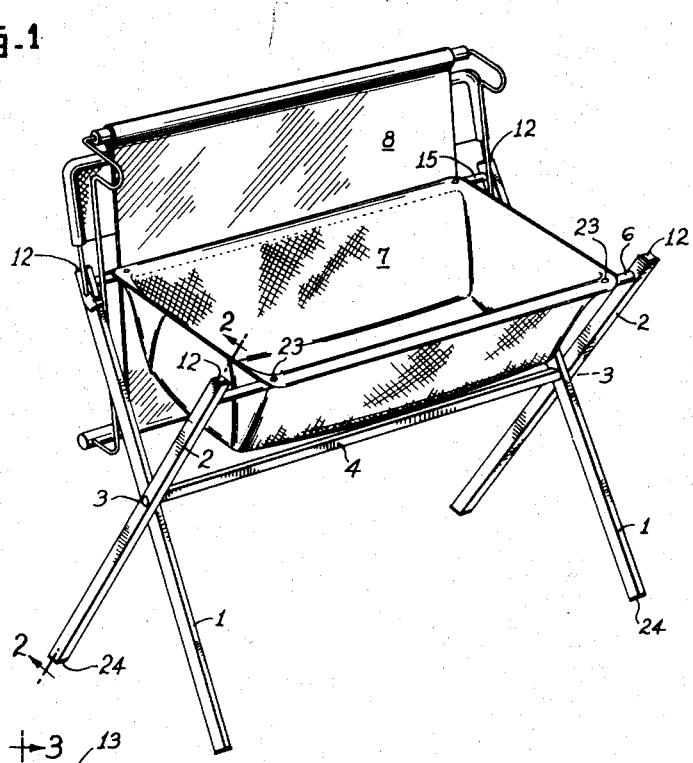
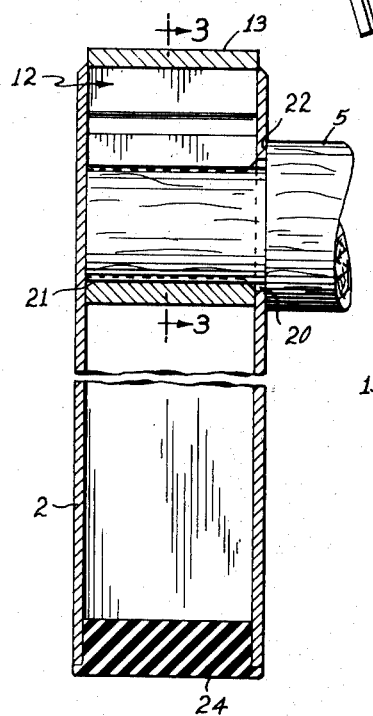
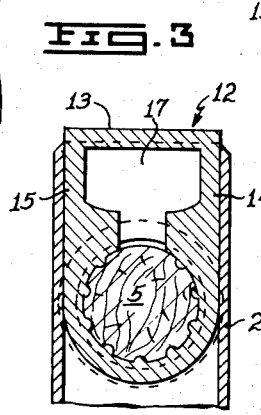
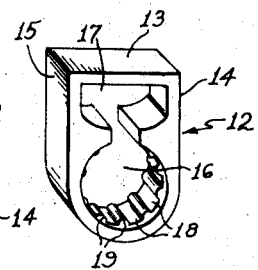
INVENTOR.
NORMAN K. BRODINE
BY
*Bennie, Edmonds, Morton and Barrows*
ATTORNEYS Patented July 14, 1953

2,645,442

UNITED STATES PATENT OFFICE 2,645,442

INFANT'S BATHING DEVICE

Norman K. Brodine, Rochester, N. Y.

Application July 1, 1947, Serial No. 758,411

4 Claims. (Cl. 248—164)

This invention relates to infants' bathing devices of the type having a tub supported on longitudinal rails which connect the upper portions of two pairs of foldable cross-legs. My invention is especially concerned with devices having tubular metal cross-legs and preferably those of rectangular cross-section. My invention provides a very simple and extremely effective means for connecting the tubular cross-legs to the longitudinal rails which comprises a gripping member insertable into each of the tubular cross-legs, having a hole for receiving an end of the longitudinal rails.

While I can use any suitable cross-sectional shape of tubular stock, I prefer to use a stock which has at least one flat face for bearing against the ends of the rails, advantageously tubing that is square in cross-section, and while I may use any suitable metal I prefer the light metals or their alloys, especially aluminum and magnesium. It is economically advantageous to use longitudinal rails of wood, such as round dowel stock. One of the features of my invention is that I use a gripping member that makes a very rigid and strong coupling of the tubular metal member to wood rails. I have discovered a gripping member which performs other important functions in addition to the primary function of engaging the rails. This gripping member comprises a hole for the insertion of the rail, which, when inserted into the cross-legs, forms a very effective closure for the tops of the legs. I so form the gripping member that it can yield under the expansion caused by forcing a rail into the hole and thereby apply a constant gripping action even after the wood may subsequently undergo a slight shrinkage.

The gripping member for insertion into a leg of square cross-section has a square cross-section in one plane and is insertable into the top of the leg and a flat end which forms an attractive and effective closure or cap for the end of the leg. The hole of the gripping member is arranged to coincide with a hole in the leg for the insertion therethrough of the rail. The rail ends are slightly larger in diameter than the hole in the gripping member and it is accordingly necessary to use appreciable force in inserting the ends. While the wood is compressed somewhat and in snug engagement on that account, there is a continuing snug gripping due to the resilient spreading of the gripping member. I prefer to use means in the gripping member which engage the wood in a manner to prevent turning in the hole. Advantageously I use a series of ribs which bite into the wood and hold it in a non-rotatable grip.

These and other novel features of the invention will be better understood after considering the following discussion taken in conjunction with the accompanying drawings, in which:

Fig. 1 is a perspective view of an infants bathing device embodying the invention, Fig. 2 is a sectional view along line 2—2 of Fig. 1, Fig. 3 is a fragmentary enlargement at 3—3 of Fig. 2, and Fig. 4 is a perspective view of a gripping member of the invention.

The baby bath illustrated in Fig. 1 is a conventional type comprising two pairs of cross-legs, each comprising a rear leg 1 and a front leg 2 pivotally connected together by the pins 3 in the center bar 4. The upper end portions of the rear legs 1 are connected together by the longitudinal rail 5 and the upper end portions of the front rails are connected together by the front longitudinal rail 6. The tub 7 is formed of the usual waterproof fabric. The dressing table 8 may be swung from its upright inoperative position to an operative position overlying the tub.

As best shown in Figs. 2 and 3, the leg 2 which is similar to the other legs, is of square cross-section and formed of a light metal like magnesium alloy. The gripping member 12 comprises a body portion that is square in cross-sectional area in one plane and effects a snug engagement inside the tubular leg. It has a flat square top 13 which projects a short distance above the upper end of the tub and forms a decorative closure. This top also bridges over and connects together the two sides 14 and 15 which extend from the lower rounded portion and in which the hole 16 is formed. The space 17 is formed largely to reduce the amount of metal in the gripping member. The inside of the hole 16 has a plurality of alternate lands 18 and ribs 19. The gripping member may be formed conveniently of a light metal, such as magnesium, by extrusion into rods which are cut into the lengths shown.

As best shown in Fig. 2, the hole 16 is in alignment with a hole 20 in the flat inner face of the leg. The longitudinal rail 6 has a neck portion 21 at its end which leaves an annular shoulder 22 bearing against the leg. The neck portion is just slightly larger in diameter than the diameter of the hole 16 between diametrically opposite lands. In order, therefore, to insert the neck into the hole 16, it is necessary that the ribs 19 actually cut into the wood and the lands 18 are under such pressure that wood is compressed slightly and the hole 16 is expanded by reason of the resiliency in the legs 14 and 15. As a consequence of this construction, the rail is permanently gripped, notwithstanding subsequent shrinkage of the wood. Both rails and the ends thereof are constructed as described and each leg is connected to a gripping member as illustrated in Figs. 2 and 3.

The ribs in the gripping member bite into the wood, as shown in Fig. 3, and prevent it from turning. The tub 7 may, accordingly, be attached to these rails in any desired manner, such as by the screws or tacks 23.

The lower ends of the legs are provided with rubber feet 24 which are inserted into the hollow centers.

One of the important advantages of the invention is the rapid and relatively inexpensive assembly which the invention permits. In constructing or assembling the device, the legs may be set in a suitable framework and squeezed into engagement with the longitudinal rails with an hydraulic ram or the like.

I claim:

1. In an infant's bathing device, the improvement which comprises two pairs of foldable cross-legs, two longitudinal rails for connecting the cross-legs together at their upper ends, each of said legs being formed of tubular metal which is rectangular in cross-section and having a longitudinal open interior, a gripping member of similar rectangular shape inserted into the upper open interior end of each leg, coincident holes in the gripping member and leg into which an end of a longitudinal rail is inserted, and a top portion for the gripping member which forms a closure for the leg.

2. In an infant's bathing device, the improvement which comprises two pairs of foldable cross-legs, two longitudinal wood rails for connecting the cross-legs together at their upper ends, each of said legs being formed of tubular metal which is rectangular in cross-section and having a longitudinal open interior, a gripping member of similar rectangular shape inserted into the upper open interior end of each leg, coincident holes in the gripping member and leg into which an end of a longitudinal rail is inserted, the gripping member being formed as a continuous ring-like structure which grips by its resistance to expansion, the hole in the gripping member being provided with rib means which bite into the rail and hold it in a non-rotatable position when the rail is forced into the hole.

3. In an infant's bathing device, the improvement which comprises two pairs of foldable cross-legs, two longitudinal rails for connecting the cross-legs together at their upper ends, each of said legs being formed of tubular metal which is rectangular in cross-section and having a longitudinal open interior, a gripping member of similar rectangular shape inserted into the upper end of each leg, coincident holes in the gripping member and leg into which an end of a longitudinal rail is inserted, the gripping member being formed as a continuous ring-like structure which grips by its resistance to expansion, side portions adjacent the hole therein which permit enlargement of the hole on the forced insertion of the rail, whereby a continuous gripping force is applied to the rail.

4. In an infant's bathing device, the improvement which comprises two pairs of foldable cross-legs, two longitudinal wood rails for connecting the cross-legs together at their upper ends, each of said legs being formed of tubular metal which is rectangular in cross-section and having a longitudinal open interior, a gripping member of similar rectangular shape inserted into the upper end of each leg, coincident holes in the gripping member and leg into which an end of the longitudinal rail is inserted, the sides of the gripping member at the hole being resiliently deformable to permit enlargement of the hole on the forced insertion of the rails, whereby a continuous gripping force is applied to the rail, and a top portion for the gripping member which interconnects the sides forming a cap for the leg.

NORMAN K. BRODINE.

References Cited in the file of this patent

UNITED STATES PATENTS

| Number | Name | Date |
| --- | --- | --- |
| 1,408,553 | Wedemann | Mar. 7, 1922 |
| 1,743,492 | Sipe | Jan. 14, 1930 |
| 2,172,137 | Ewing | Sept. 5, 1939 |
| 2,415,180 | John | Feb. 4, 1947 |
| 2,504,203 | Kennedy | Apr. 18, 1950 |

FOREIGN PATENTS

| Number | Country | Date |
| --- | --- | --- |
| 542,997 | Germany | Nov. 9, 1927 |